(12) United States Patent
Kakiuchi et al.

(10) Patent No.: US 6,360,267 B1
(45) Date of Patent: Mar. 19, 2002

(54) COMMUNICATION CONTROL APPARATUS, METHOD, AND COMPUTER READABLE STORAGE MEDIUM FOR DETERMINING A RELAY APPARATUS ON INFORMATION

(75) Inventors: Tatsumi Kakiuchi; Eiji Mizunuma; Ikuo Takekawa, all of Kawasaki; Hiroko Takekawa, Yokohama; Takeshi Saito, Kawaski, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/518,148

(22) Filed: Mar. 3, 2000

Related U.S. Application Data

(63) Continuation of application No. PCT/JP99/01657, filed on Mar. 31, 1999.

(30) Foreign Application Priority Data

Jul. 3, 1998 (JP) .............................. 10-188423

(51) Int. Cl.⁷ .............................. G06F 15/16
(52) U.S. Cl. ................ 709/227; 709/230; 709/249; 370/402
(58) Field of Search ................ 709/227, 224, 709/230, 249; 370/402

(56) References Cited

U.S. PATENT DOCUMENTS

| | | | | |
|---|---|---|---|---|
| 5,519,705 A | * | 5/1996 | Fukutomi | 370/402 |
| 5,999,979 A | * | 12/1999 | Vellanki et al. | 709/232 |
| 6,003,084 A | * | 12/1999 | Green | 709/227 |
| 6,014,699 A | * | 1/2000 | Ratcliff et al. | 709/224 |
| 6,021,331 A | * | 2/2000 | Cooper et al. | 455/507 |
| 6,069,947 A | * | 5/2000 | Evans et al. | 379/229 |
| 6,108,704 A | * | 8/2000 | Hutton et al. | 709/227 |
| 6,167,450 A | * | 12/2000 | Angwin et al. | |

FOREIGN PATENT DOCUMENTS

| | | |
|---|---|---|
| JP | 6-332866 | 12/1994 |
| JP | 7-221741 | 8/1995 |

* cited by examiner

*Primary Examiner*—Krisna Lim
(74) *Attorney, Agent, or Firm*—Staas & Halsey

(57) ABSTRACT

The present invention relates to the communication between a client and a server. A communication control method has a step for specifying a relay apparatus corresponding to a designated apparatus to be communicated with based on relay definition information which relates information for specifying the apparatus to be communicated with to information for specifying the relay apparatus to relay the communication with the apparatus to be communicated with and a step for establishing a relay connection with the specified relay apparatus.

14 Claims, 25 Drawing Sheets

FIG. 6

| TEMPORARY DESCRIPTER | REAL DESCRIPTOR | CONNECTION STATUS | USAGE OF GATEWAY |
|---|---|---|---|
| 1 | 1 0 0 1 | CONNECTED | IN USE |
| 2 | 1 0 0 4 | DISCONNECTED | NOT IN USE |
| 3 | 1 0 1 0 | CONNECTED | IN USE |

FIG. 7

| SERVER | | GATEWAY IP ADDRESS |
|---|---|---|
| IP ADDRESS | PORT NUMBER | |
| 123.123.123.1 | 999 | 111.222.111.222 |
| 123.123.123.* | * | 222.111.222.111 |
| | | |
| | | |
| | | |
| | | |
| | | |

FIG. 8

| LOCATION NUMBER | LOCATION NAME | IP ADDRESS | CONNECTION TYPE | GATEWAY MANAGEMENT TABLE NUMBER |
|---|---|---|---|---|
| 1 | HEADQUARTERS | 33.33.33.33 | LAN | |
| 2 | OSAKA BRANCH | 22.22.22.22 | VIA GATEWAY | 1 |
| 3 | HOME | 44.44.44.44 | DIAL-UP | 2 |

COMMUNICATION CONTROL APPARATUS, METHOD, AND COMPUTER READABLE STORAGE MEDIUM FOR DETERMINING A RELAY APPARATUS ON INFORMATION

This application is a continuation of PCT/JP99/01657, filed Mar. 31, 1999.

TECHNICAL FIELD

The present invention relates to a communication control apparatus, a communication control method therefor and a storage medium for storing a communication control program which are used in a communication between a client and a server.

BACKGROUND ART

There are many types of communications between a client and a server. For example, as shown in FIG. 5, a server 504 has clients, such as a mobile computer 503 connected to the server 504 through a LAN 506, a mobile computer 502 connected to the server 504 through a public telecommunication network 510 and a gateway 505, a mobile computer 501 connected to the server 504 through a mobile telephone 508, the public telecommunication network 510 and the gateway 505, etc.

Recently, personal computers have rapidly advanced with greater computing power in small-sized computers. Therefore, a high performance computer may be easily carried, that is to say, use of the mobile computer has become wide-spread.

On the other hand, when the mobile computer is used as a client of a server application program on the server, the configuration of the client may need to be modified according to the communication type because there are many types of communications between clients and servers. For example, the World-Wide Web (WWW) system is known in which a modification of the configuration is needed according to the connection type.

In the WWW system, a WWW browser program on the client requests an HTML document stored in the server based on an HTTP protocol. Then, the server sends the designated HTML document to the client and the WWW browser program displays the HTML document received from the server on a screen. In the WWW system, a server called a proxy server is provided between the client and the server. The WWW browser program in the client sends information to identify the requested HTML document to the proxy server. When the requested document is stored in a cache in the proxy server, the proxy server can send the requested HTML document to the client without accessing the server.

However, the user must set up the configuration of the WWW browser program when a gateway, such as the proxy server, is used. In other words, the user needs to set up the configuration of each program when there are a plurality of programs to be set up.

Further, there is an application program which can not be connected using multiple connection types. This application program needs to be re-written. That is to say, the client application program which is intended to communicate directly with the server can not be used in communication through the gateway. Therefore, full advantage of the mobile computer is not taken because the user is allowed to connect to the server using only one connection type.

Further, while the public telephone network is used to connect the client with the server, the network is frequently disconnected because the public telephone network is not designed for data communication but rather for speech communication. High quality high-speed data communication is not ensured. The network may also be disconnected as a result of the condition of a radio wave while the mobile telephone is used to connect the client with the server. The network may also be disconnected because of a failure of a communication apparatus on the network wherein a LAN is used to connect the client with the server.

It is an object of the present invention to provide a communication control for the client-server system that enables the client to connect with the server using any connection type without modification of any existing client application programs.

It is another object of the present invention to provide communication control which enables recovery from a disconnected communication without restarting the application program.

DISCLOSURE OF INVENTION

The above first object of the present invention is achieved by a communication control method. In the communication control method, a relay apparatus corresponding to a designated apparatus to be communicated with is determined based on relay definition information which relates information for specifying the apparatus to be communicated with to information for specifying the relay apparatus. Then, the relay connection with the determined relay apparatus is established.

The above second object of the present invention is achieved by an automatic re-connection of the relay connection when the relay connection is disconnected.

BRIEF DESCRIPTION OF DRAWINGS

Other objects, features and advantages of the present invention will become more apparent from the following detailed description when read in conjunction with the accompanying drawings, in which:

FIG. 6 shows an embodiment of a connection management table;

FIG. 7 shows an embodiment of a gateway management table;

FIG. 8 shows an embodiment of a location management table;

BEST MODE FOR CARRYING OUT THE INVENTION

An embodiment of the present invention will be explained using the drawings as follow.

Figure 4:
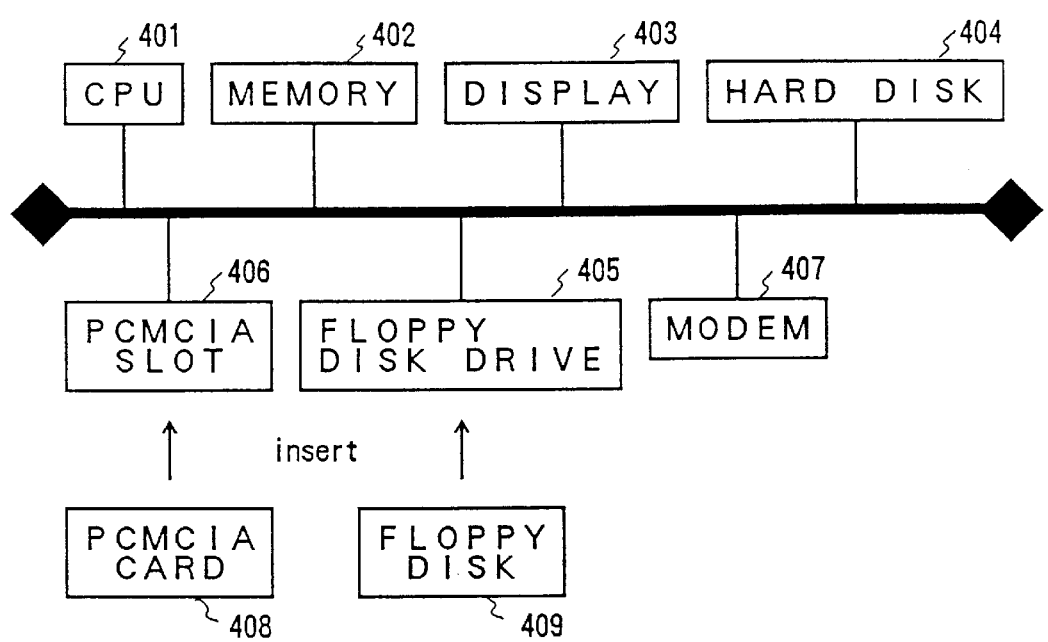
FIG. 4 shows a hardware configuration of a computer.
Figure 5:
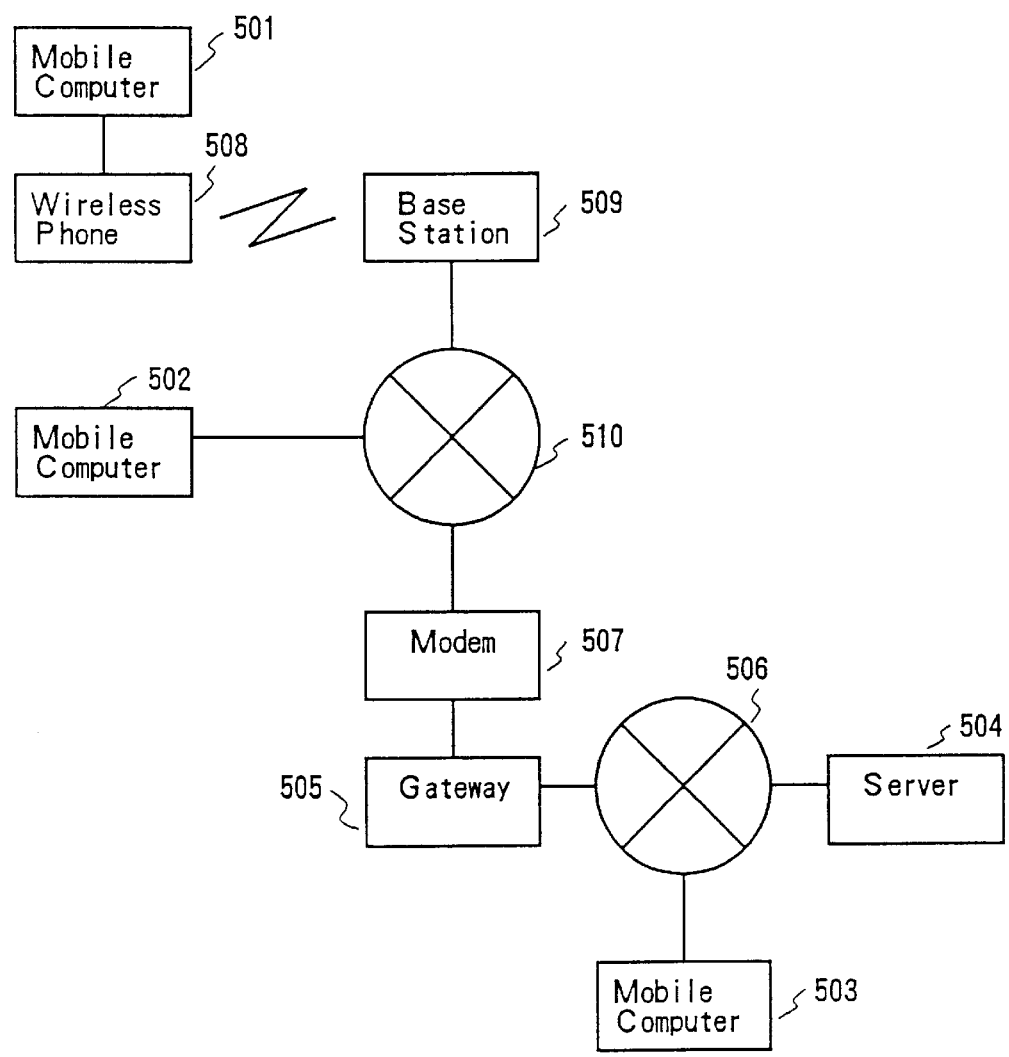
FIG. 5 shows an example of a configuration of a network.

FIG. 4 shows a hardware configuration of a computer which is used as a client computer, a gateway computer and a server computer in the embodiment. Each computer has a CPU 401, a memory 402, a display monitor 403, a hard disk drive 404, a floppy disk drive 405, a PCMCIA slot 406 and a modem 407. Further, the computer has a mouse as a pointing device, however, it is not shown.

The modem 407 is used to communicate with another apparatus through a telephone network. A PCMCIA card 408 is inserted into the PCMCIA slot 406.

There are many kinds of PCMCIA cards, such as a LAN card to connect the computer to the LAN, a mobile telephone card to communicate with another apparatus through a mobile telephone, etc.

A floppy disk 409 is inserted into the floppy disk drive 405. The floppy disk drive 405 is used to store programs and data to the floppy disk 409 and to read the programs and the data from the floppy disk 409.

The hard disk drive 404 is used to store programs and data. An operating system program to control the computer, application programs and various kinds of data are stored in the hard disk drive 404.

The programs stored in the hard disk 404 or the floppy disk 409 are loaded to the memory 402 under the control of the operating system and are executed by the CPU 401.

Next, the main software components in the client computer, the gateway computer and the server computer will be explained using FIG. 1, FIG. 2 and FIG. 3 respectively.

Figure 1:
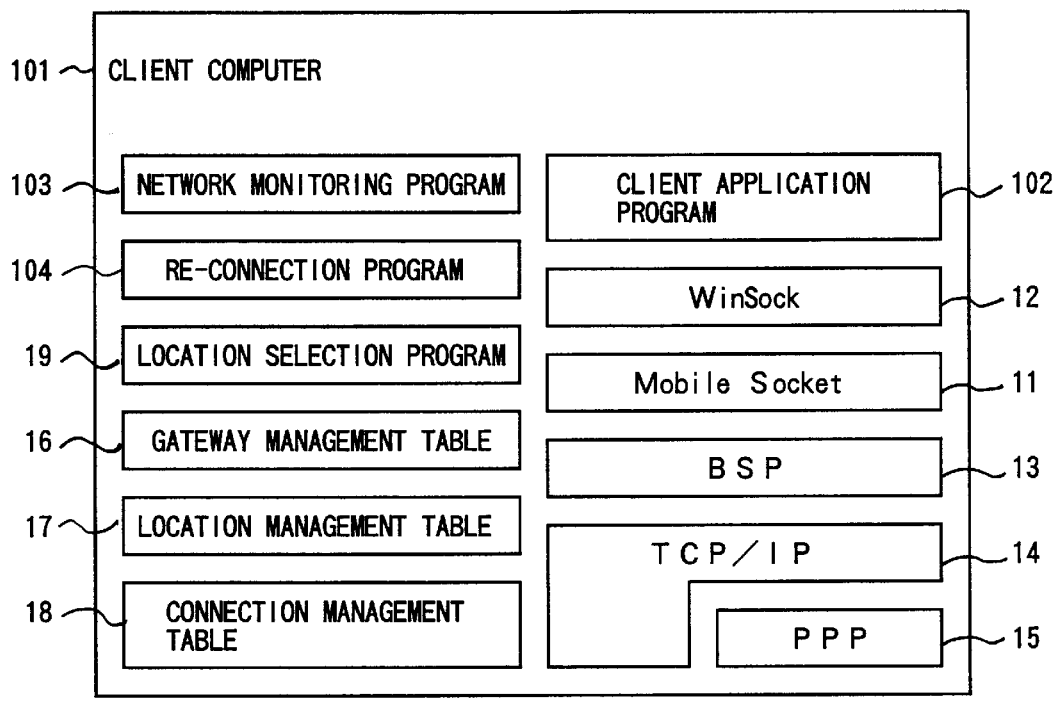
FIG. 1 shows a configuration of a client computer.

As shown in FIG. 1, the client computer 101 includes a client application program 102, a network monitoring program 103, a re-connection program 104, a MobileSocket 11, a WinSock 12, a BSP 13, a TCP/IP 14, a PPP (Point to Point Protocol) 15, a gateway management table 16, a location management table 17, a connection management table 18 and a location selection program 19.

Figure 2:
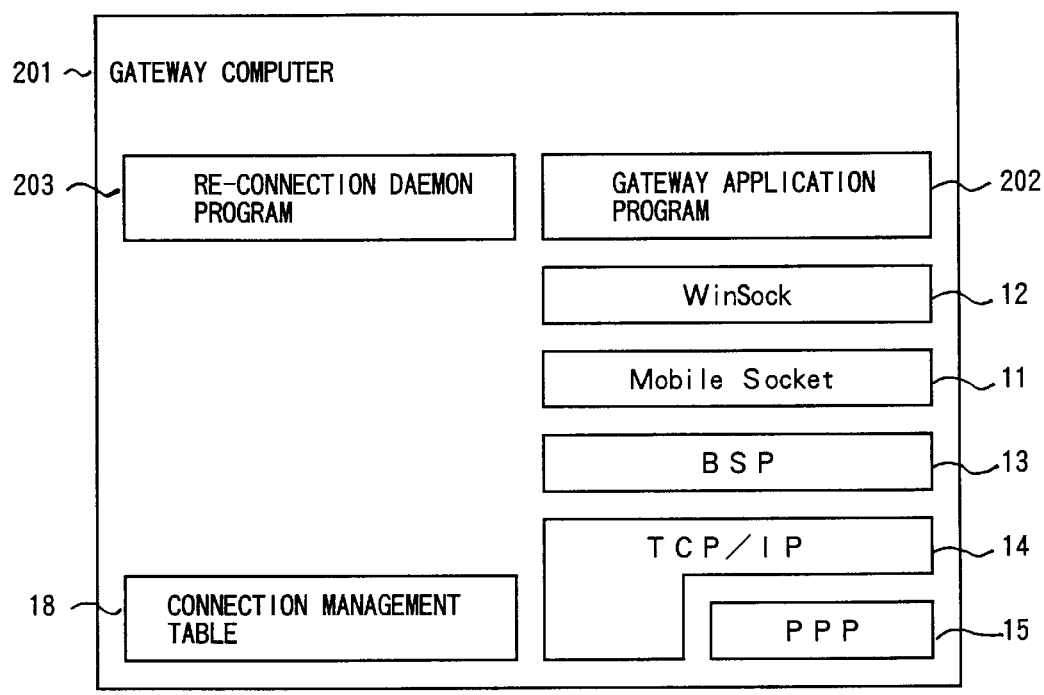
FIG. 2 shows a configuration of a gateway computer.

As shown in FIG. 2, the gateway computer 201 Includes a gateway application program 202, the MobileSocket 11, the WinSock 12, the BSP 13, the TCP/IP 14, the PPP 15, the connection management table 18 and a re-connection daemon program 203.

Figure 3:
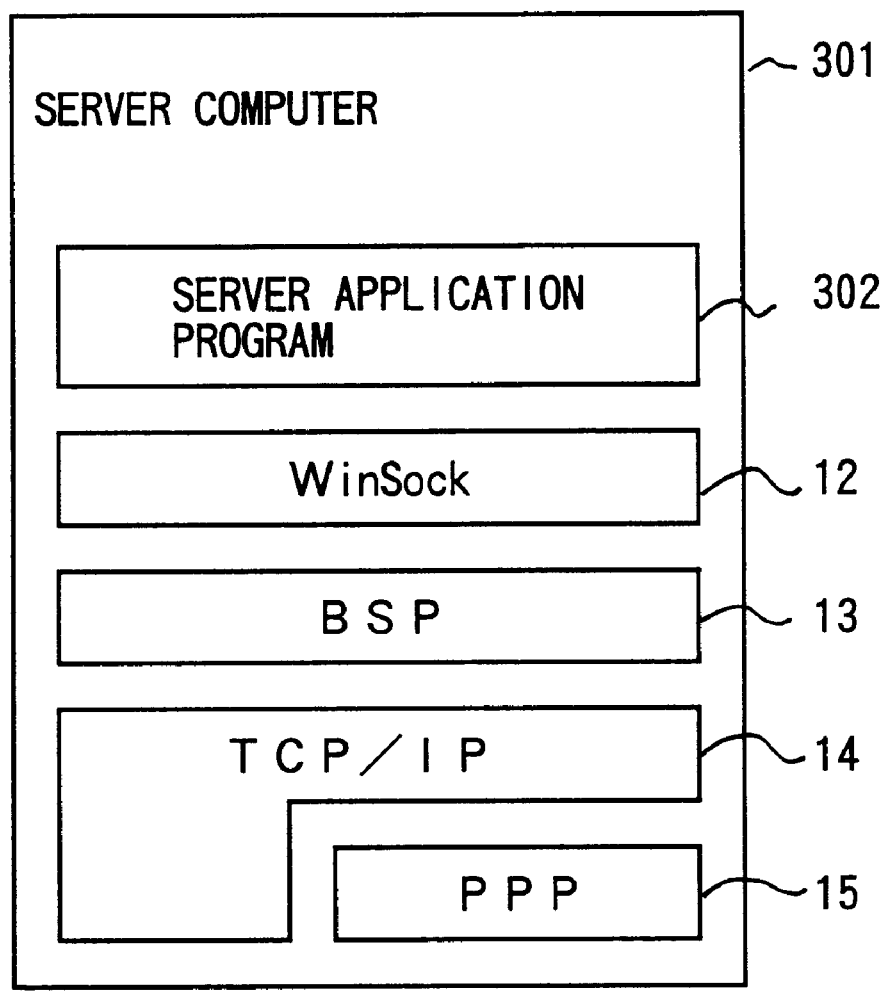
FIG. 3 shows a configuration of a server computer.

As shown in FIG. 3, the server computer 301 includes a server application program 302, the WinSock 12, the BSP 13, the TCP/IP 14 and the PPP 15.

The server application program 302 provides a service to the client application program 102 through a network. The gateway application program 202 relays a communication between the client application program 102 and the server application program 302.

The WinSock 12 is a program to provide the application program with an interface to a communication function. The BSP 13 is a program to execute a command received by the WinSock 12. Another program can be placed between the WinSock 12 and the BSP 13. In this embodiment, the MobileSocket 11 is placed between the WinSock 12 and the BSP 13. The MobileSocket 11 and the WinSock 12 will be precisely explained later.

The TCP/IP 14 is a program to execute operations according to the TCP/IP protocol. The PPP 15 is a program to enable point-to-point communications through the telephone network.

The WinSock 12 operates as an interface between the application program and a SOCKET command, a CONNECT command, a SEND command, a RECEIVE command, an ACCEPT command, a SHUTDOWN command and a CLOSE command.

The SOCKET command is used to request toopen communication resources. The application program can obtain a descriptor which is an information to specify a connection of the communication.

The CONNECT command is used to request to connect to an apparatus to be communicated with. The descriptor which specifies the connection, and an IP address and a port number which specify the apparatus to be communicated with are also designated when the application program issues the CONNECT command.

The SEND command is used to send data to the apparatus to be communicated with through the connection. The descriptor which specifies the connection and data to be sent are also designated when the application program issues the SEND command.

The RECEIVE command is used to receive data from the apparatus to be communicated with through the connection. The descriptor which specifies the connection and a buffer in which received data is to be stored are also designated when the application program issues the RECEIVE command.

The ACCEPT command is used to request to connect to the apparatus to be communicated with in response to a connection request (the CONNECT command) from the apparatus to be communicated with. The descriptor which specifies the connection is also designated when the application program issues the ACCEPT command.

The SHUTDOWN command is used to request a disconnection of the communication. The descriptor which specifies the connection is also designated when the application program issues the SHUTDOWN command.

The CLOSE command is used to request to release the communication resources. The descriptor which specifies the communication resources to be released is also designated when the application program issues the CLOSE command.

A procedure in which the client application program 102 communicates with the server application program 302 using the commands provided by the WinSocket 12 is as follows.
(1) The SOCKET command is issued and the descriptor is obtained.
(2) The CONNECT command with the descriptor, the IP address of the server computer 301 and the port number to specify the server application program 302, is issued and the connection with the server application program 302 is established.
(3) The data is sent to or received from the server application program 302 using the SEND command or the RECEIVE command. The descriptor is also designated when the command is issued.
(4) The SHUTDOWN command with the designated descriptor is issued and the connection is disconnected.
(5) The CLOSE command with the designated descriptor is issued and the resources are released.

On the other hand, a procedure of the server application program 302 is as follows.
(1) The SOCKET command is issued and the descriptor is obtained.
(2) The ACCEPT command with the designated descriptor is issued and the connection with the client application program 102 is established.
(3) The data is sent to or received from the client application program 102 using the SEND command or the RECEIVE command. The descriptor is also designated when the command is issued.
(4) The SHUTDOWN command with the designated descriptor is issued and the connection is disconnected.
(5) The CLOSE command with the designated descriptor is issued and the resources are released.

In this embodiment, the MobileSocket 11 is placed between the interface of the WinSock 12 and the BSP 13 in both the client computer 101 and the gateway computer 201.

Next, tables used in the embodiment will be explained.

FIG. 7 shows an embodiment of a gateway management table 16. The gateway management table 16 is managed and referenced by the MobileSocket 11 in the client computer 101 and includes a plurality of entries each of which has a relation with the IP address of the server computer 301, the port number of the server application program 302 and the IP address of the gateway computer 201. There are a plurality of gateway management tables 16 and an unique number (starting from one) is assigned to each of the gateway management tables so as to be manageable.

It is possible to describe the IP address of the server computer 301 and the port number of the server application program 302 with wild card notations.

The gateway management table 16 is used to manage the information to automatically decide which gateway computer to relay to when the client application program communicates with a server application program.

FIG. 8 shows an embodiment of a location management table 17. The location management table manages a communication definition information which differs according to the location where the client computer is used. Each entry corresponding to each location has a relation among a location number, a location name, the IP address, the connection type and the gateway management table number.

The location information is identified by the location number. The location name is information by means of which the user of the client computer 101 can identify the location management information.

The IP address is assigned to the client computer 101 according to the selected location.

The connection type shows how the client computer 101 is connected to the server application program 302 according to the selected location. For example, there are the connection types, such as the LAN, a via-gateway and a dial-up connection.

The gateway management table number specifies the gateway management table to be used when the connection type at the selected location is the via-gateway. The gateway management table number specifies nothing when the connection type is the LAN.

When the user selects the location, the location selection program 19 is executed and all the location names stored in the location management table 17 are displayed. Then, the user selects an adequate location name. The location number of the selected location is stored as a selected location number.

When the gateway management table number is assigned to the selected location, the gateway management table number is also stored as the selected gateway management table number. When the gateway management table 17 is referred to, the gateway management table which is identified by the selected gateway management table number among the plurality of gateway management tables is the only one used.

Next, an embodiment of a connection management table 18 will be explained using FIG. 6. The descriptor is a number to identify the connection which is a unit of the communication. The connection management table is used to manage the relation between the descriptor generated by the BSP and the descriptor generated by the MobileSocket. The descriptor generated by the BSP is called a real descriptor and the descriptor generated by the MobileSocket is called a temporary descriptor.

Further, the connection management table manages a connection status and information which shows whether the gateway is used for the communication using the connection or not.

Next, an operation of MobileSocket will be explained using FIG. 9, FIG. 10, FIG. 11, FIG. 12, FIG. 13, FIG. 14, FIG. 15, FIG. 16, FIG. 17, FIG. 18 and FIG. 19. A role of the MobileSocket is to automatically assign the gateway which relays the communication and to ensure the communication.

Figure 9:
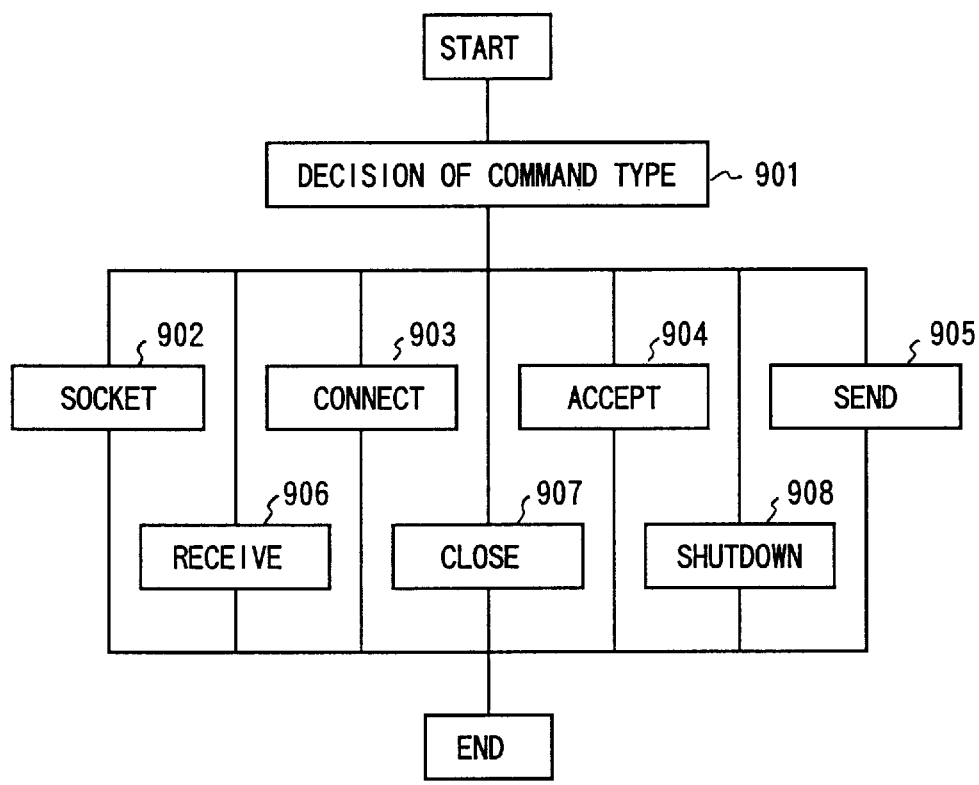
FIG. 9 shows an outline of an operation of a Mobile-Socket.

As shown in FIG. 9, the MobileSocket 11 receives a command issued by the application program through the WinSock 12 and decides the command type (step 901). Then, the MobileSocket 11 executes a predetermined transaction according to the decided command. The MobileSocket 11 identifies all the commands of the WinSock, such as SOCKET, CONNECT, ACCEPT, SEND, RECEIVE, SHUTDOWN and CLOSE and executes a transaction according to a result of the identification. If the MobileSocket can not identify the command, the command is transferred to the BSP 13 without any transaction.

Figure 10:
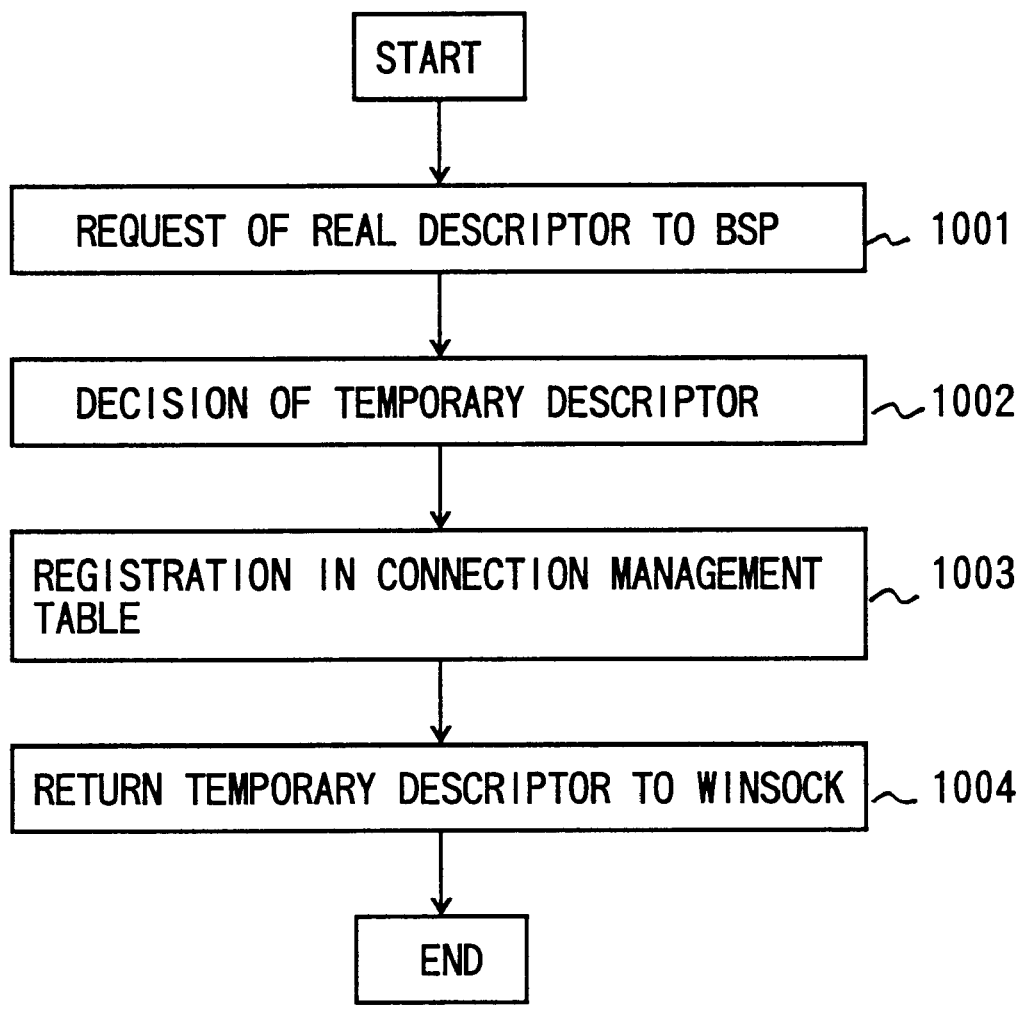
FIG. 10 shows an operation of the MobileSocket in response to a SOCKET command.

Next, the operation of the MobileSocket 11 will be explained when the command is the SOCKET using FIG. 10.

First, the MobileSocket 11 requests the execution of the SOCKET command to the BSP and obtains the descriptor (the real descriptor) (step 1001).

Next, a unique number (the temporary descriptor) is determined in the MobileSocket (step 1002).

Then, the relation between the temporary descriptor and the real descriptor is registered in the management table (step 1003).

Finally, the MobileSocket 11 returns the temporary descriptor to the application program through the WinSock interface (step 1004).

Figure 11:
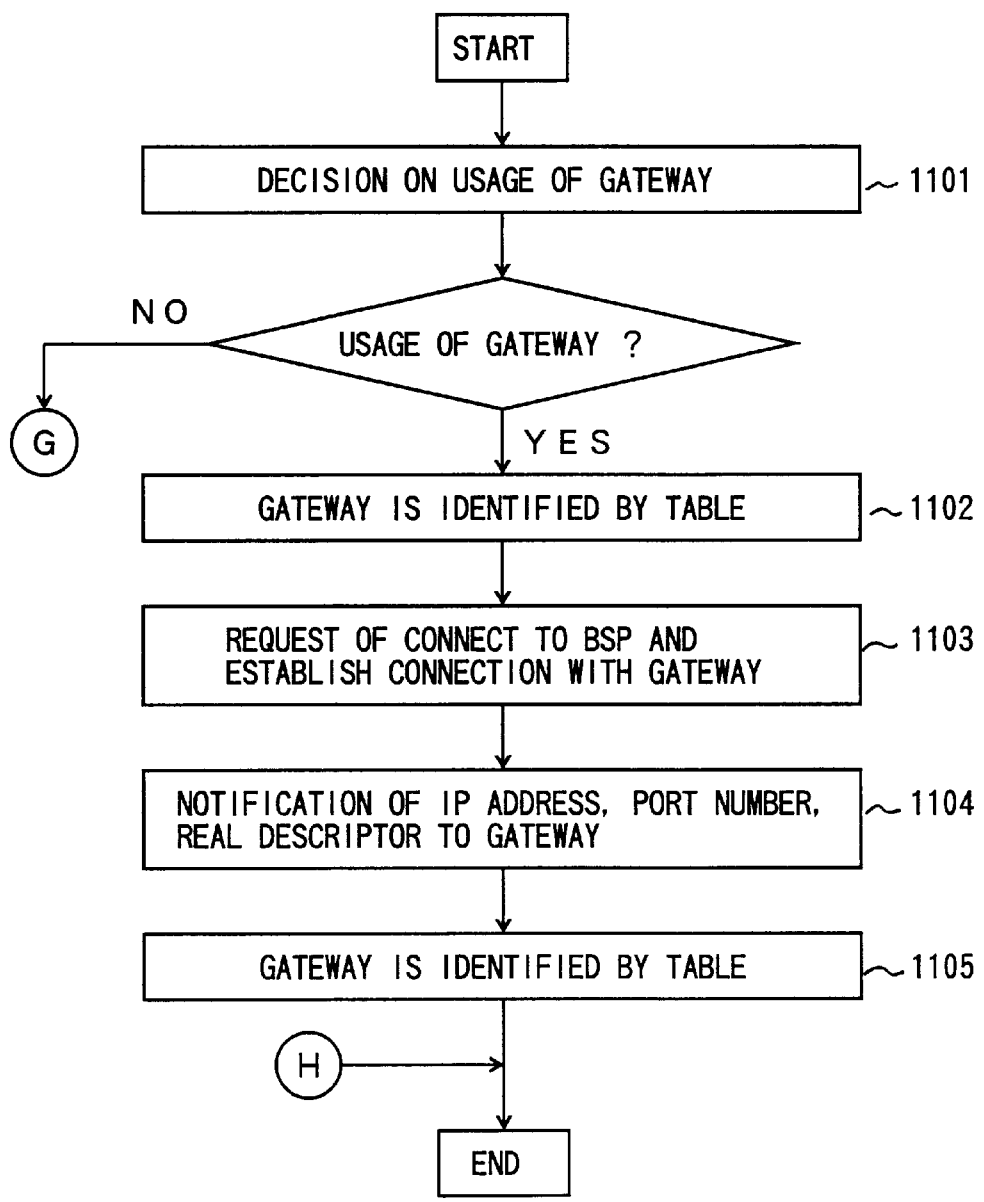
FIG. 11 shows an operation of the MobileSocket in response to a CONNECT command.
Figure 12:
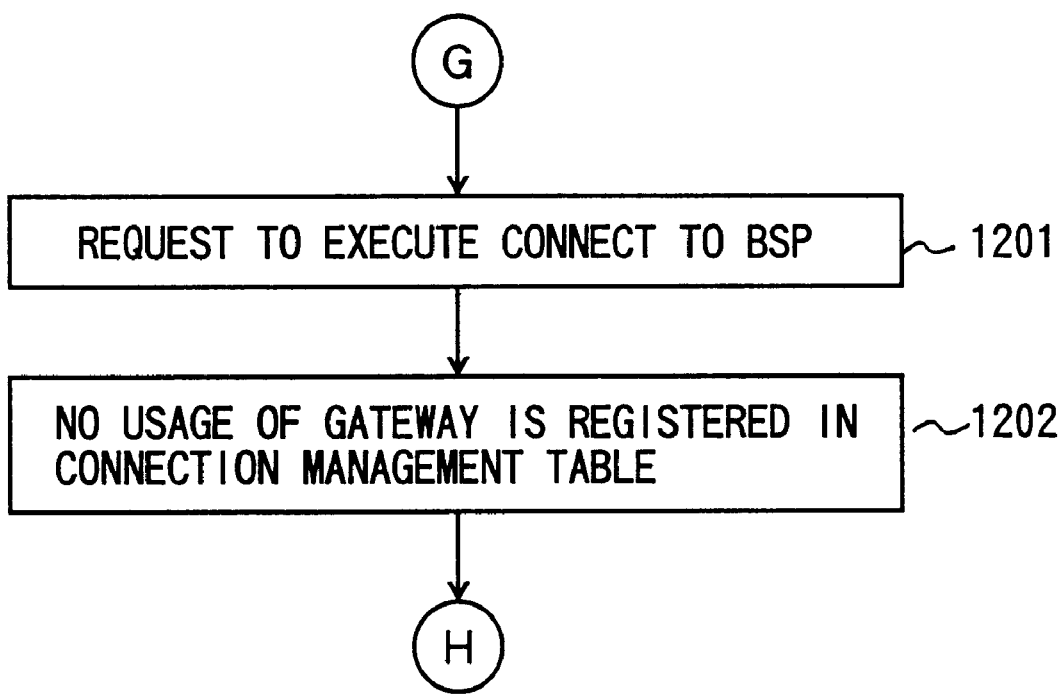
FIG. 12 also shows the operation of the MobileSocket in response to the CONNECT command.

Next, the operation of MobileSocket 11 will be explained when the command is CONNECT using FIG. 11 and FIG. 12.

First, a decision on usage of the gateway is made by means of searching the gateway management table designated by the selected gateway management table number using the IP address of the server computer and the port number of the server application program (step 1101).

When the gateway is not used, the BSP is requested to execute the CONNECT command with the descriptor designated by the application program and the connection with the server application program is established (step 1201). Then, information which shows that the gateway is not in use is registered in the connection management table (step 1202).

On the other hand, when the gateway is used, the IP address of the gateway computer 201 in the gateway management table 16 is obtained (step 1102). Then, the MobileSocket 11 requests the BSP 13 to execute the CONNECT command using the real descriptor corresponding to the descriptor (temporary descriptor) designated by the application program, the IP address of the gateway computer 201 and a port number which designates the gateway application program 202. Then, the connection between the MobileSocket 11 and the gateway application program 202 is established (step 1103).

Next, the MobileSocket 11 notifies the IP address of the server computer 301 designated by client application program, the port number of the server application program 302 and the real descriptor of the connection to the gateway application program 202 by means of requesting the BSP 13 to execute the SEND command with the same designated real descriptor (step 1104).

Finally, information which shows that the gateway is in use is registered in the connection management table 18 (step 1105).

Figure 13:
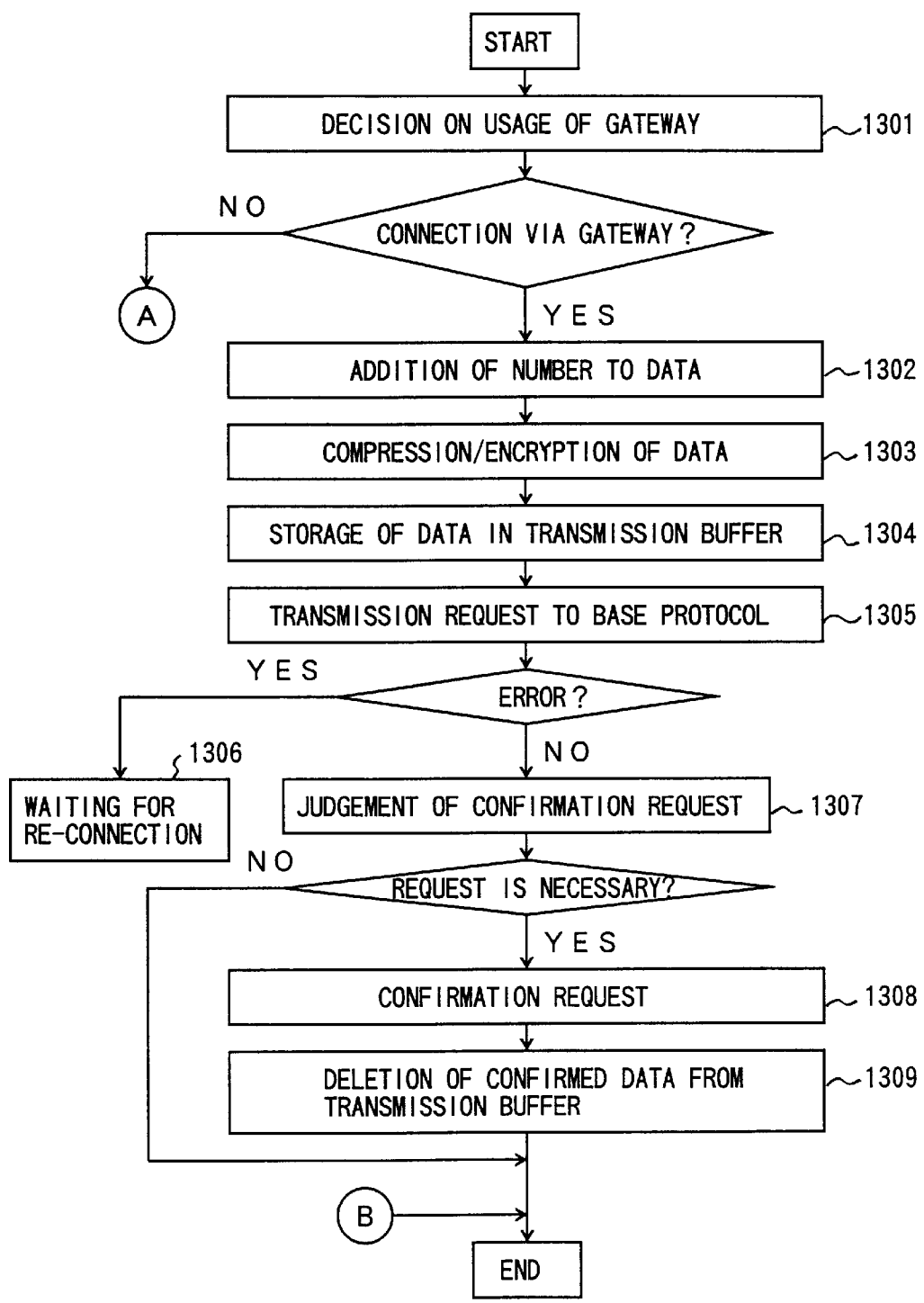
FIG. 13 shows an operation of the MobileSocket in response to a SEND command.
Figure 14:
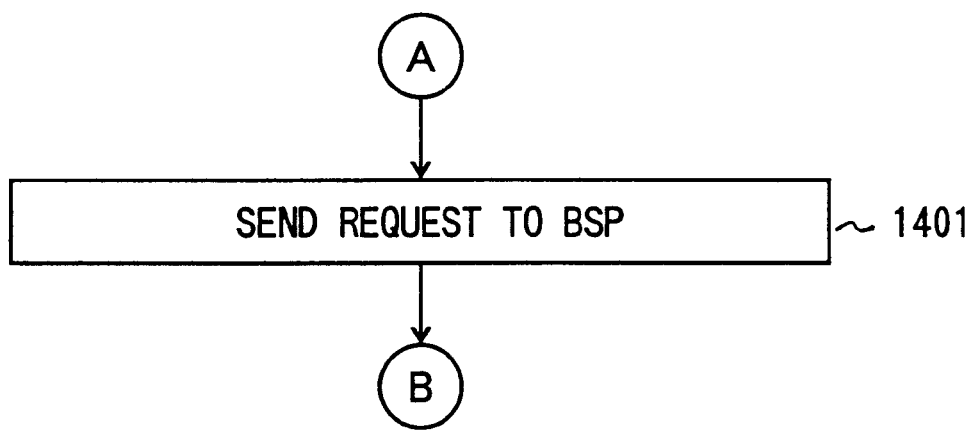
FIG. 14 also shows the operation of MobileSocket in response to the SEND command.

Next, the operation of the MobileSocket 11 will be explained when the command is the SEND using FIG. 13 and FIG. 14.

First, a decision on an usage of the gateway is made by means of the connection management table 18 (step 1301).

When the gateway is not used, the descriptor and data designated by the application program is designated by the MobileSocket and the BSP is requested to execute the CONNECT command (step 1401).

On the other hand, when the gateway is used, a serial number is added to the data to be transferred (step 1302). Then, the data is compressed, encrypted (step 1303) and stored in the transmission buffer (step 1304). Then, the MobileSocket 11 requests the BSP 13 to execute the SEND command using the real descriptor which shows the connection between the MobileSocket 11 and the gateway application program 202 and the data to be sent (step 1305). If a disconnection is detected, the MobileSocket 11 waits for a reconnection (step 1306) after the network monitoring program 103 confirms the disconnection of the telephone network. Otherwise, whether the number of the data in the transmission buffer is larger than a predetermined value is determined (step 1307). If the number of the data in the transmission buffer is larger than the predetermined value, an confirmation request is issued to the gateway application program (step 1308). Then, the data correctly received by the gateway application program is deleted from the transmission buffer based on a number received by the gateway application program, which shows that the data with the number is correctly received by the gateway application program (step 1309). Then the transaction is finished.

Figure 15:
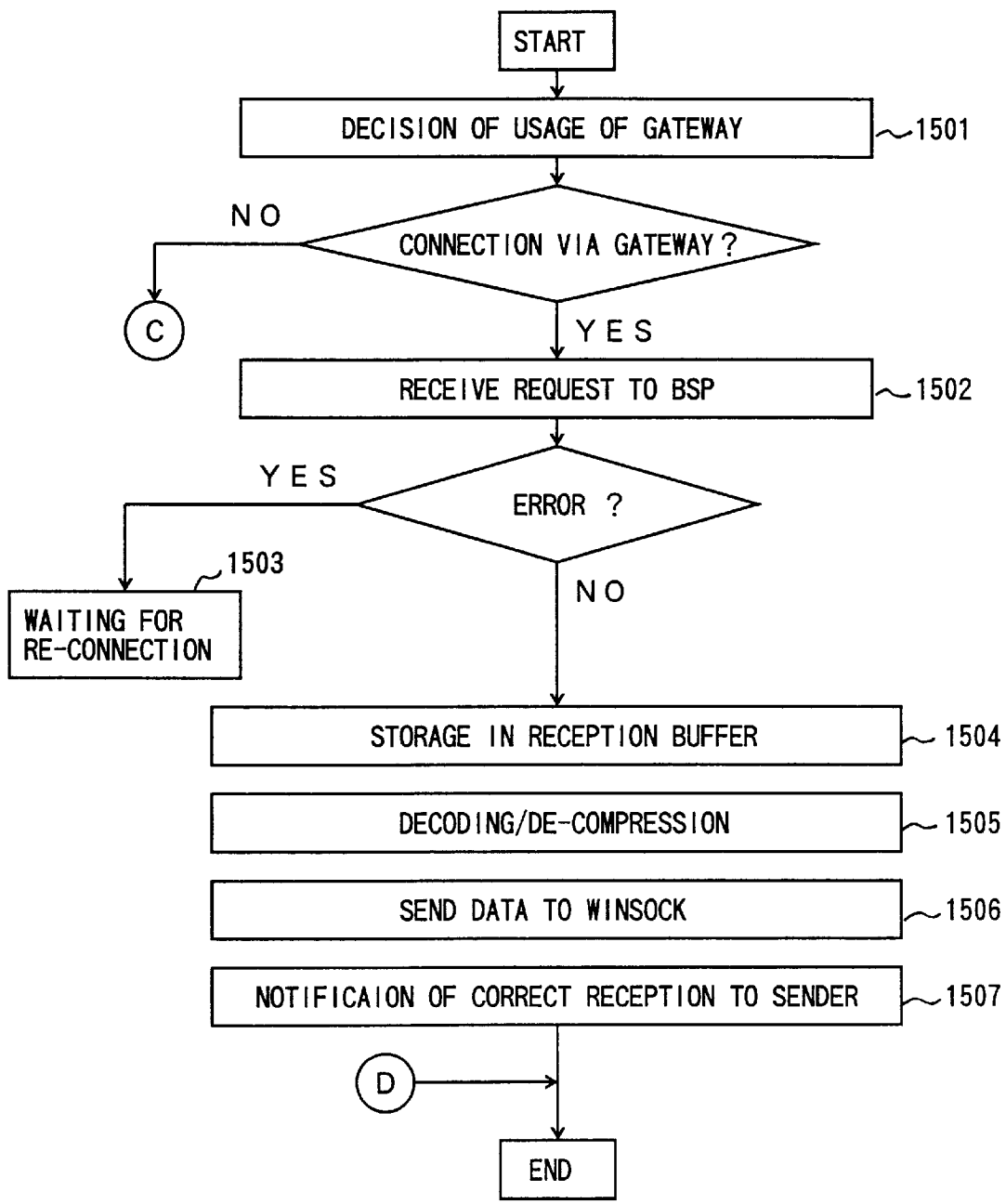
FIG. 15 shows an operation of the MobileSocket in response to a RECEIVE command.
Figure 16:
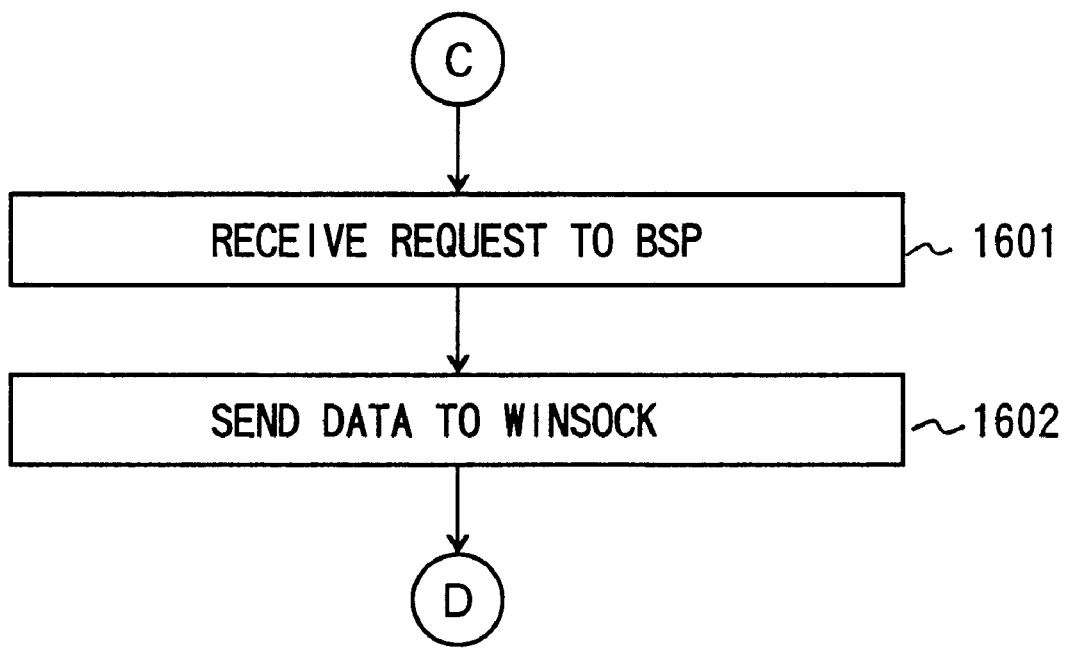
FIG. 16 also shows the operation of the MobileSocket in response to the RECEIVE command.

Next, the operation of the MobileSocket 11 will be explained when the command is the RECEIVE command using FIG. 15 and FIG. 16.

First, a decision on an usage of the gateway is made by means of the connection management table 18 (step 1501).

When the gateway is not used, the descriptor and the buffer to store the data designated by the application program is designated by the MobileSocket and the BSP 13 is requested to execute the RECEIVE command (step 1601). Then the received data is returned to the application program through the WinSock (step 1601).

On the other hand, when the gateway is used, the real descriptor of the connection between the MobileSocket 11 and the gateway application program 202 and the reception buffer to store the received data, which reception buffer is a different buffer from the buffer designated by the application program, is designated by the MobileSocket and the BSP 13 is requested to execute the RECEIVE command. If a disconnection is detected, the MobileSocket 11 waits for a reconnection (step 1503) after the network monitoring program 103 confirms the disconnection of the telephone network. Otherwise, the data is received in the reception buffer (step 1504) and the data in the reception buffer is decoded and decompressed (step 1505). Next, the decoded and decompressed data is stored in the buffer designated by the application program (step 1506). Then, the transaction is finished after notification, which shows the data number of the correctly received data, is issued to the gateway application program 202.

Figure 17:
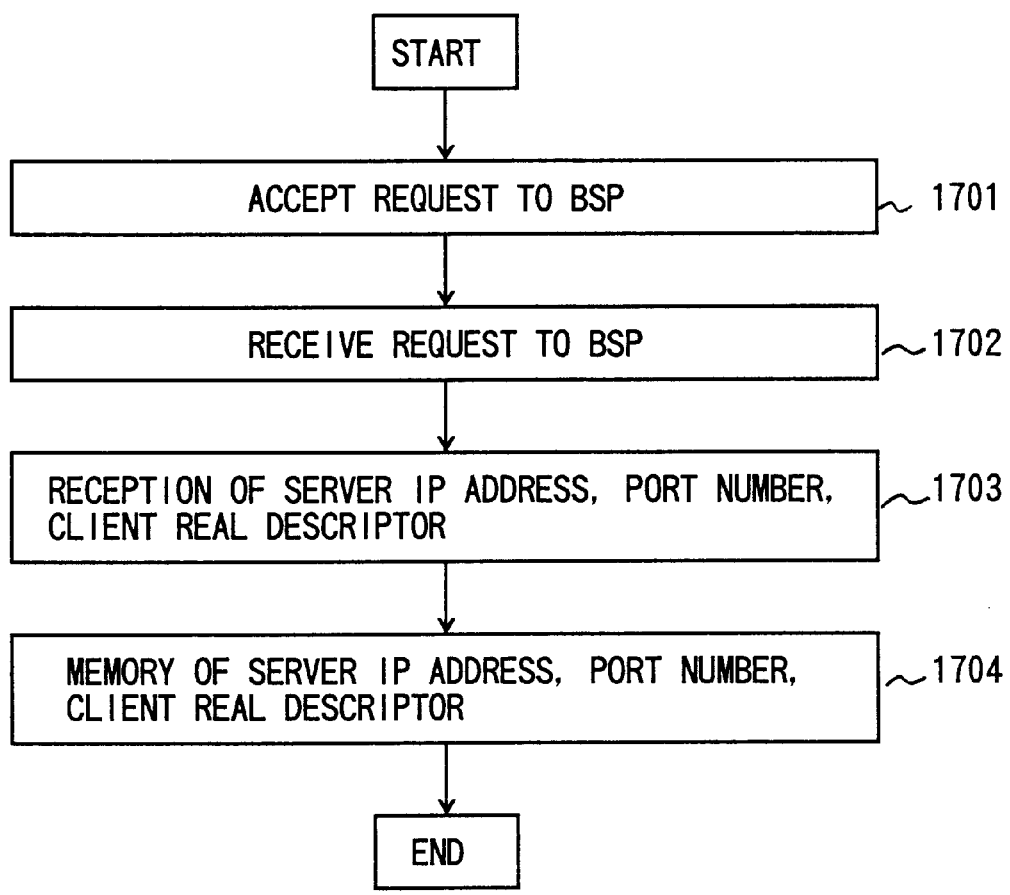
FIG. 17 shows an operation of the MobileSocket in response to an ACCEPT command.

Next, the operation of the MobileSocket 11 will be explained when the command is the ACCEPT command using FIG. 17. This transaction only occurs in the MobileSocket 11 in the gateway computer 201 and never occurs in the MobileSocket 11 in the client computer 101 because the client application program 102 never issues the ACCEPT command.

First, the MobileSocket 11 requests the BSP 13 to execute the ACCEPT command. Then, the connection with the client application program 102 which issued the CONNECT command is established.

Next, the IP address of the server computer 310, the port number of the sever application program 302 and the real descriptor in the client which are sent from the MobileSocket 11 of the client are received (step 1702, 1703). Finally, the received IP address, the port number and the real descriptor are stored (step 1704).

Figure 18:
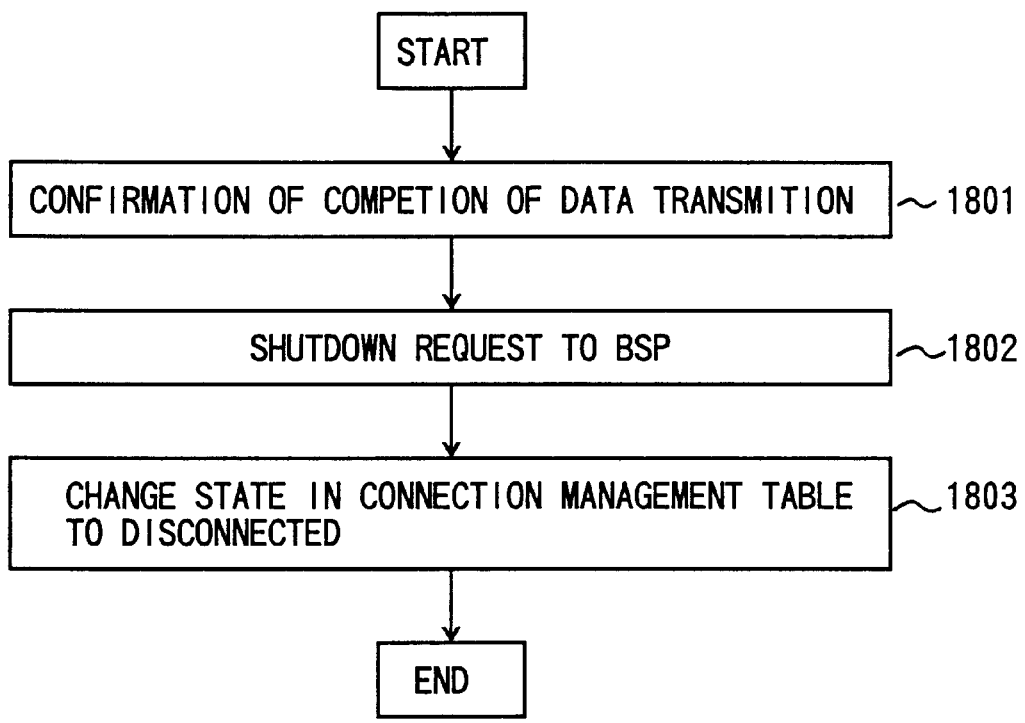
FIG. 18 shows an operation of the MobileSocket in response to a SHUTDOWN command.

Next, the operation of the MobileSocket 11 will be explained when the command is the SHUTDOWN command using FIG. 18.

First, the MobileSocket 11 negotiates with the MobileSocket 11 in the apparatus to be communicated with to confirm that all data is sent. If any data to be sent remains, each MobileSocket 11 sends the data to each other (step 1801).

Next, the real descriptor is designated and the BSP 13 is requested to execute the SHUTDOWN command (step 1802).

Finally, the disconnection status is registered in the connection management table 18 (step 1803).

Figure 19:
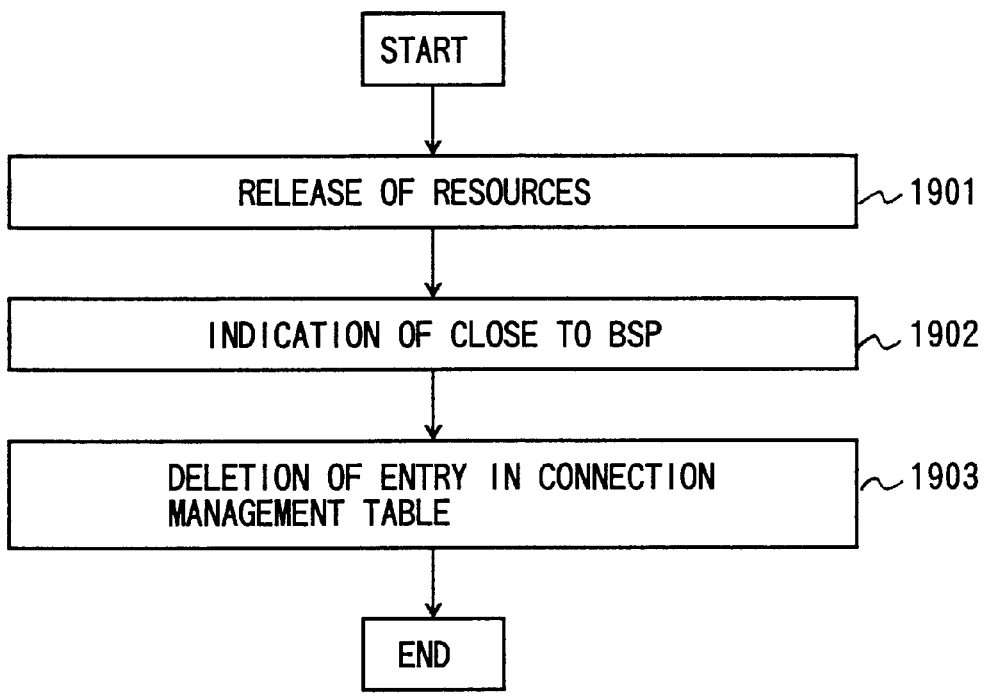
FIG. 19 shows an operation of the MobileSocket in response to a CLOSE command.
Figure 20:
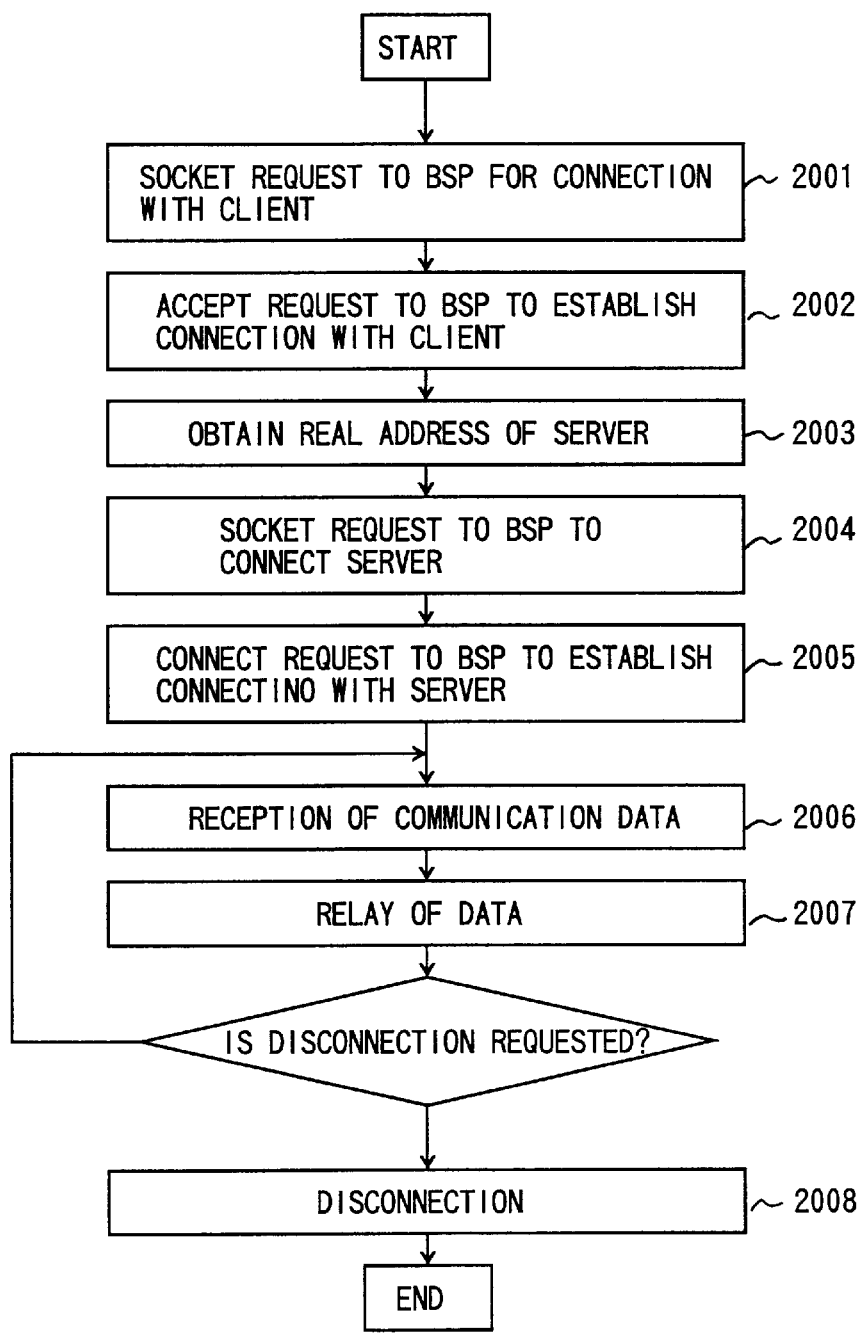
FIG. 20 shows an operation of a gateway application program.

Next, the operation of the MobileSocket 11 will be explained when the command is the CLOSE command using FIG. 19.

First, the MobileSocket 11 searches the real descriptor corresponding to the designated temporary descriptor in the connection management table (step 1901).

Next, the obtained real descriptor is designated and the BSP 13 is requested to execute the CLOSE command.

Finally, an entry is deleted from the connection management table 18 (step 1903) and the transaction is finished.

Next, an operation of the gateway application program 202 will be explained. As mentioned above, the gateway application program 202 relays the communication between the client application program 102 and the server application program 302.

The gateway application program is executed on the gateway computer and relays the communication between the client application computer and the server application computer. The procedure of transactions will be explained below.

First, the gateway application program 202 issues the SOCKET command to obtain the descriptor needed to establish the connection with the client application program 102 (step 2001).

Next, the descriptor is designated and the ACCEPT command is issued to establish the connection in response to the CONNECT command from the client (step 2002).

Next, the IP address of the server computer 301 sent from the MobileSocket 11 of the client computer 101 and the port number of the server application program 302 are extracted from the MobileSocket 11 through a dedicated interface (step 2003).

Next, the SOCKET command is issued to obtain the descriptor needed to establish the connection with the server (step 2004).

Next, the descriptor, the IP address of the server computer 301 and the port number of the server application program 302 are designated and the CONNECT command is issued to the server to request the connection with the server (step 2005). As a result, the connection between the client application program 102 and the server application program 302 through the gateway application program 202 is established.

Then, the data from the client application program 102 is received by means of designating the descriptor of the connection with the client application program 102 and issuing the RECEIVE command, and in response to the reception of the data, the data from the client application program 102 is sent to the server application program 302 by means of designating the descriptor of the connection with the server application program 302 and issuing the SEND command. The data from the server application program 302 is received by means of designating the descriptor of the connection with the server application program 302 and issuing the RECEIVE command, and in response to the reception of the data, the data from the server application program 302 is sent to the client application program 102 by means of designating the descriptor of the connection with the client application program 102 and issuing the SEND command. Further, above mentioned procedures are asynchronously repeated.

Then, the connection with client application program 102 is disconnected by means of designating the descriptor of the connection with the client application program 102 and issuing the SHUTDOWN command in response to the disconnection request from the client application program 102, and the connection with server application program 302 is disconnected by means of designating the descriptor of the connection with the server application program 302 and issuing the SHUTDOWN command. Finally, the resources assigned to the connection with client application program 102 are released by means of designating the descriptor assigned to the connection with the client application program 102 and issuing the CLOSE command, and the resources assigned to the connection with server application program 302 are released by means of designating the descriptor assigned to the connection with the server application program 302 and issuing the CLOSE command. Then the transaction is finished (step 2008).

Figure 21:
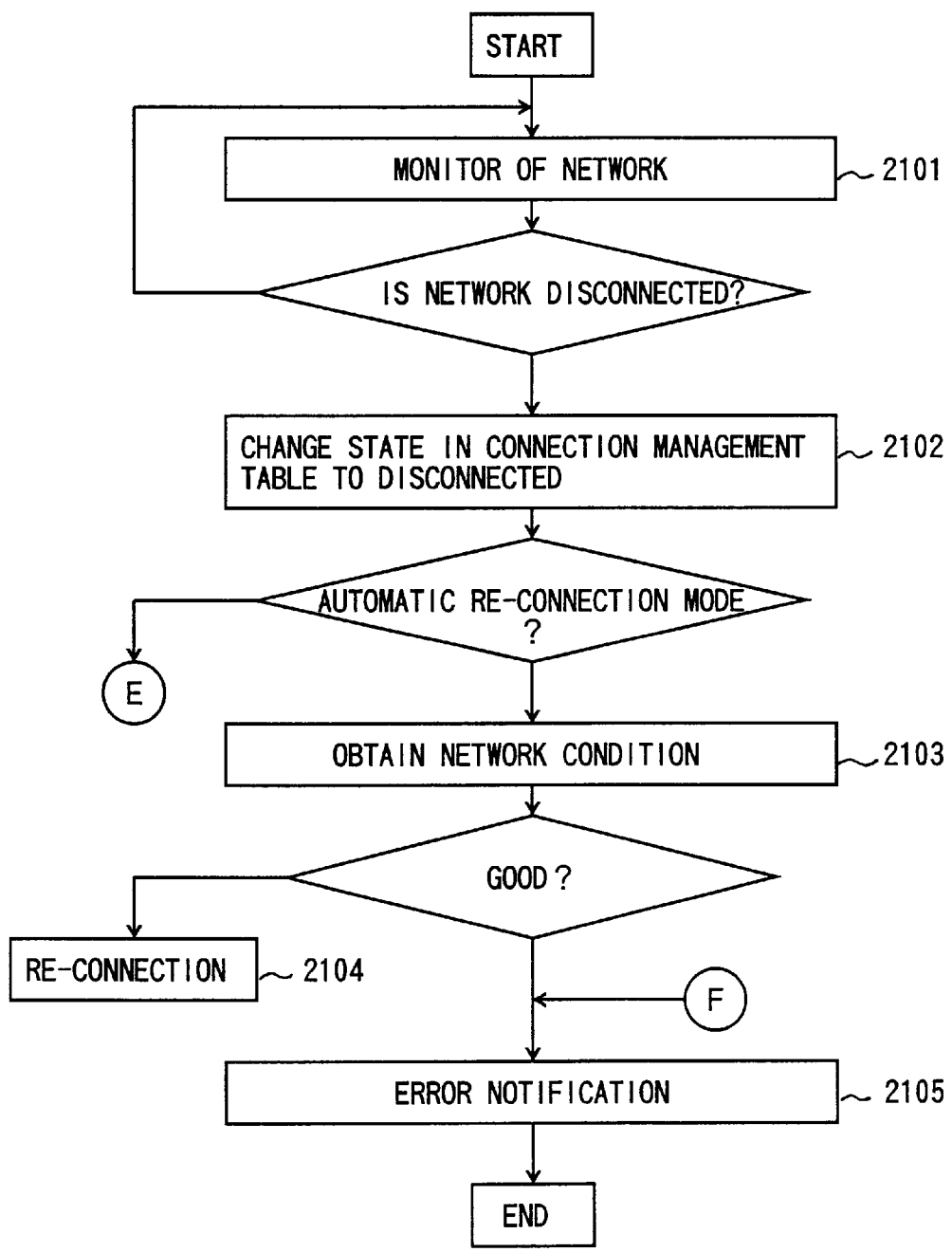
FIG. 21 shows an operation of a network monitoring program.
Figure 22:
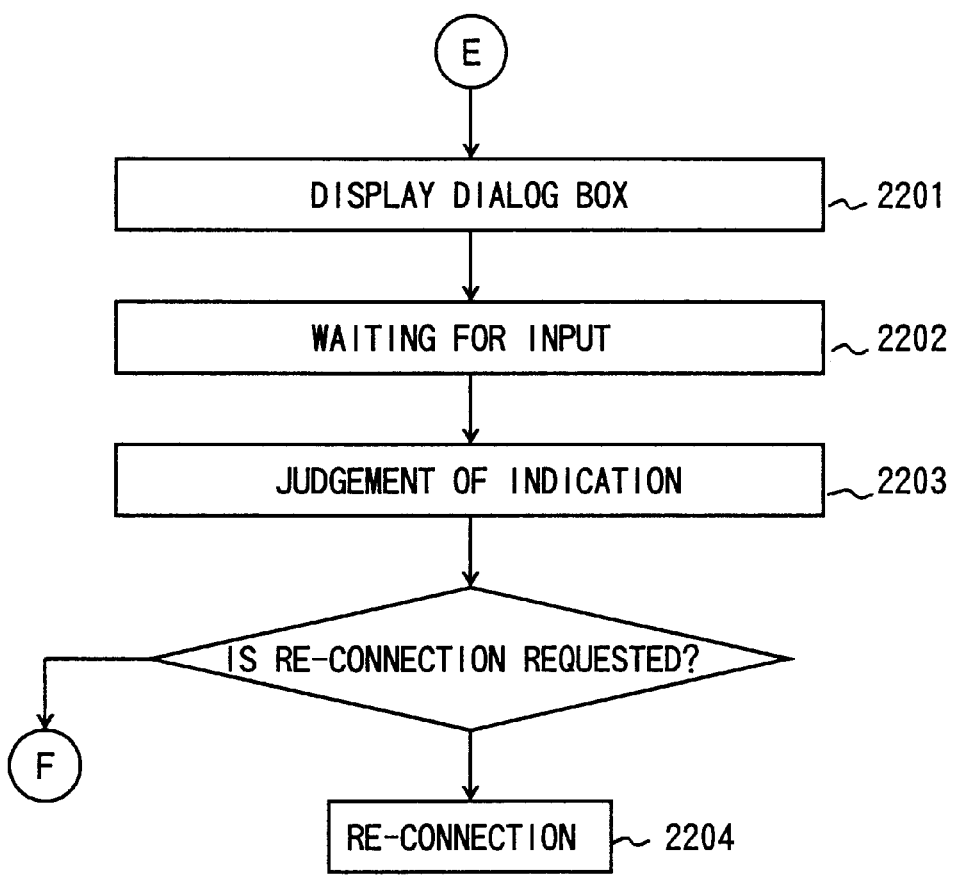
FIG. 22 also shows the operation of the network monitoring program.

Next, the network monitoring program 103 will be explained using FIG. 21. The network monitoring program 103 is executed on the client computer 101 and monitors the condition of the connection of the network. The network monitoring program 103 monitors the condition of the network (step 2101). When the disconnection of the network is detected, the network monitoring program 103 changes the corresponding connection status to disconnected in the connection management table 18 (step 2102).

Next, the network monitoring program 103 checks whether an automatic re-connection is designated. When the automatic re-connection is designated, the network monitoring program 103 decides whether the quality of the telephone network is good enough to recover the connection. If the quality of the telephone network is good enough to recover the connection, the re-connection procedure is executed (step 2104). On the other hand, if it is impossible to recover the connection, an error notification message is sent (step 2105).

When the automatic re-connection is not designated, the network monitoring program 103 displays a message window to confirm the re-connection and waits for a user action (step 2201, 2202). Next, the user action is analyzed (step 2203). When the user action is to initiate the re-connection, the re-connection is executed by the re-connection program 104 called by the network monitoring program 103 (step 2204).

Figure 23:
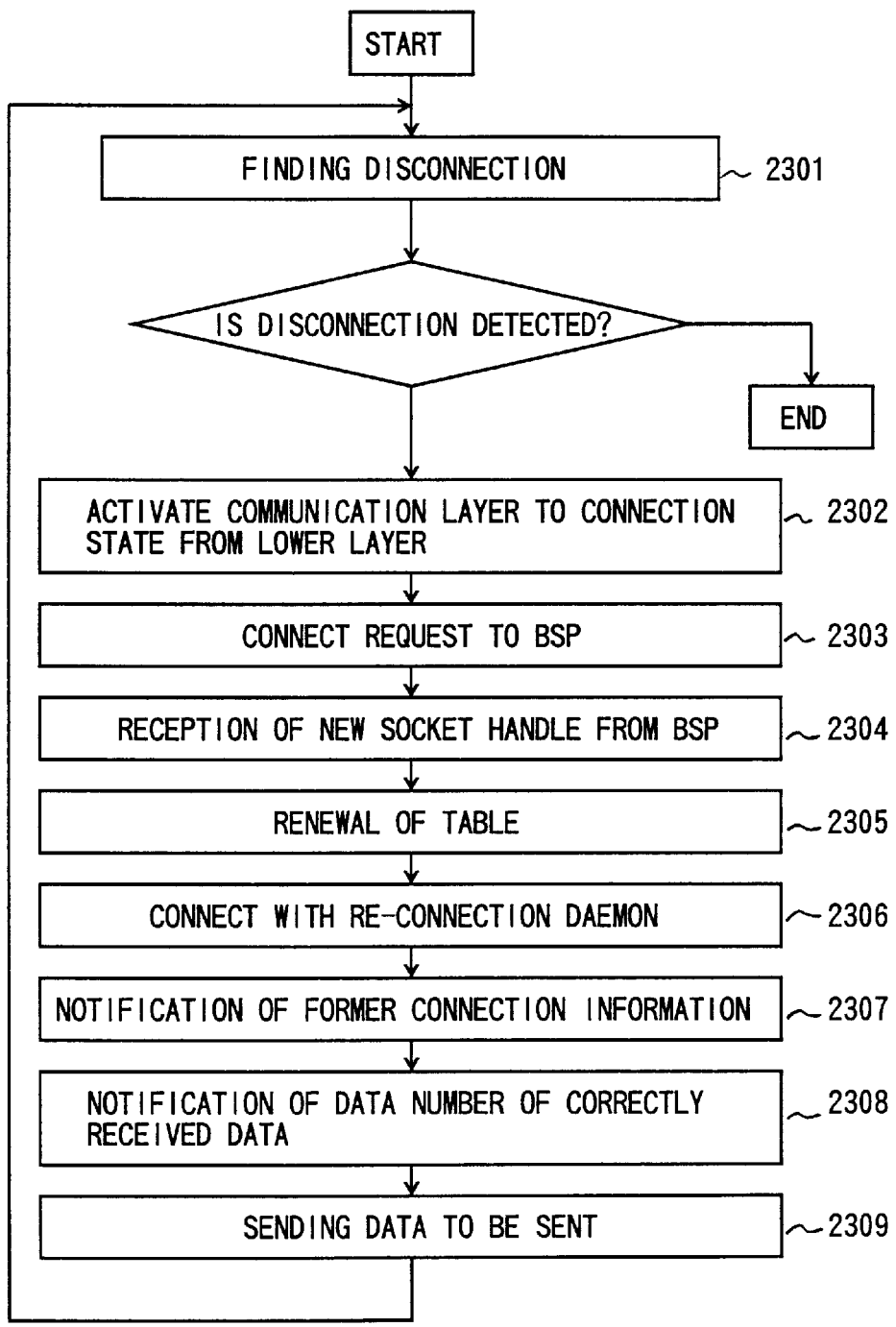
FIG. 23 shows an operation of a re-connection program.

Next, an operation of the re-connection program 104 will be explained using FIG. 23.

The transaction described below is performed in order on each disconnection upon detecting the disconnection (step 2301).

First, the communication layer is activated up to the connection state from the lower communication layer in order. For example, dialing is executed when the layer to be activated is the dial-up connection (step 2302).

Next, the BSP 13 is requested to execute the SOCKET command (step 2303) and a new real descriptor is obtained (step 2304).

Next, the real descriptor of the disconnection is replaced by the real descriptor of the new connection in the connection management table (step 2305).

Next, the real descriptor of the new connection, the IP address of the gateway computer and a port number (a fixed value) of the re-connection daemon program 203 (a resident program of the computer are designated and the CONNECT command is issued to the BSP 13 to request the connection with the re-connection daemon program (step 2306).

Next, the former connection information (the real descriptor of the disconnection) is notified by the re-connection daemon program 203. As a result, the MobileSocket 11 of the client computer 101 and the MobileSocket 11 of the gateway computer 201 can communicate with each other.

Finally, the re-connection program 104 negotiates with the gateway application program 202. The re-connection program 104 notifies the data number of the correctly received data to the gateway application program 202 and also receives the data number of the correctly received data from the gateway application program 202. Then, the data having a number following the data number of the correctly received data stored in the transmission buffer is sent to the gateway application program 202 in response to the data number of the correctly received data from the gateway application program 202 (step 2308, 2309). Then, the re-connection transaction is finished.

Figure 24:
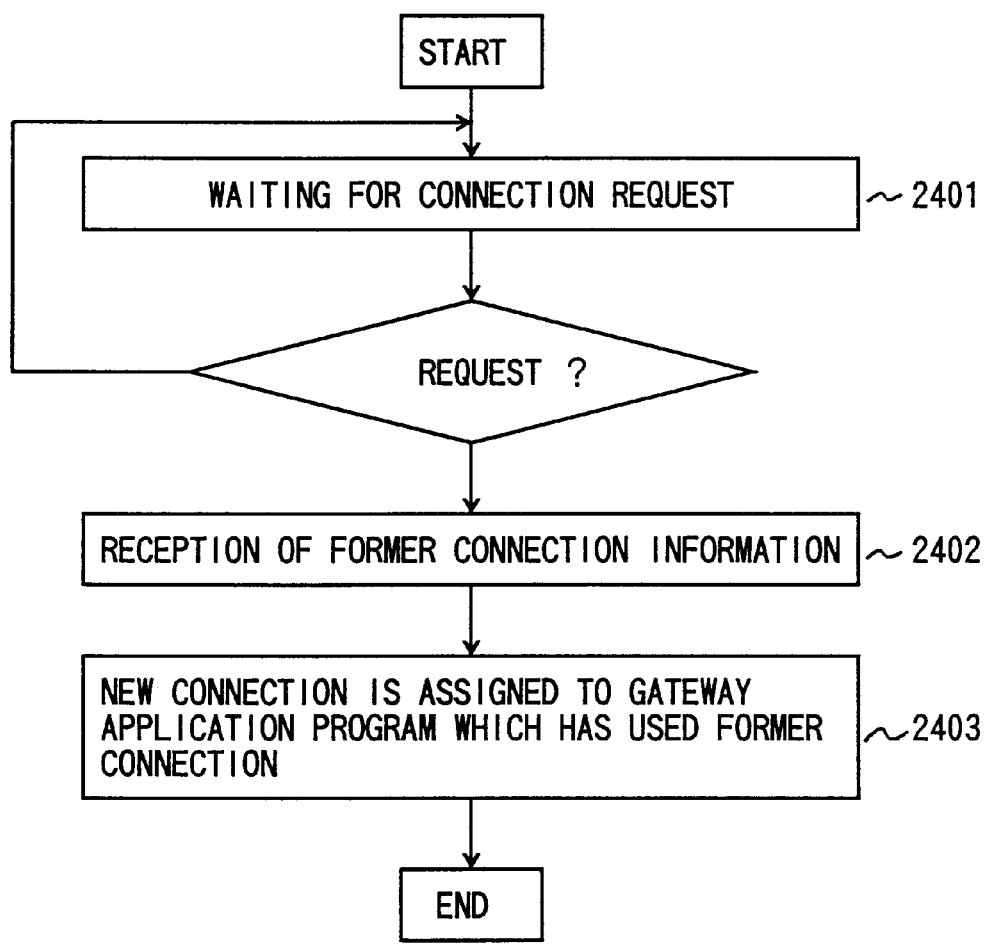
FIG. 24 shows an operation of a re-connection daemon program.

On the other hand, an operation of the re-connection daemon program 203 is as follows (as shown in FIG. 24).

First, the re-connection daemon program 203 issues the ACCEPT command to connect in response to the connection request (step 2401). Next, in response to the connection request, the re-connection daemon program 203 issues the RECEIVE command and receives the real descriptor of the disconnection (step 2302). Finally, a new connection is assigned to the gateway application program 202 which has used the real descriptor of the disconnection. As a result, the gateway application program 202 of which connection has been disconnected is allowed to communicate again. Therefore, the communication between the client application program 102 and the server application program 302 is restarted.

Figure 25:
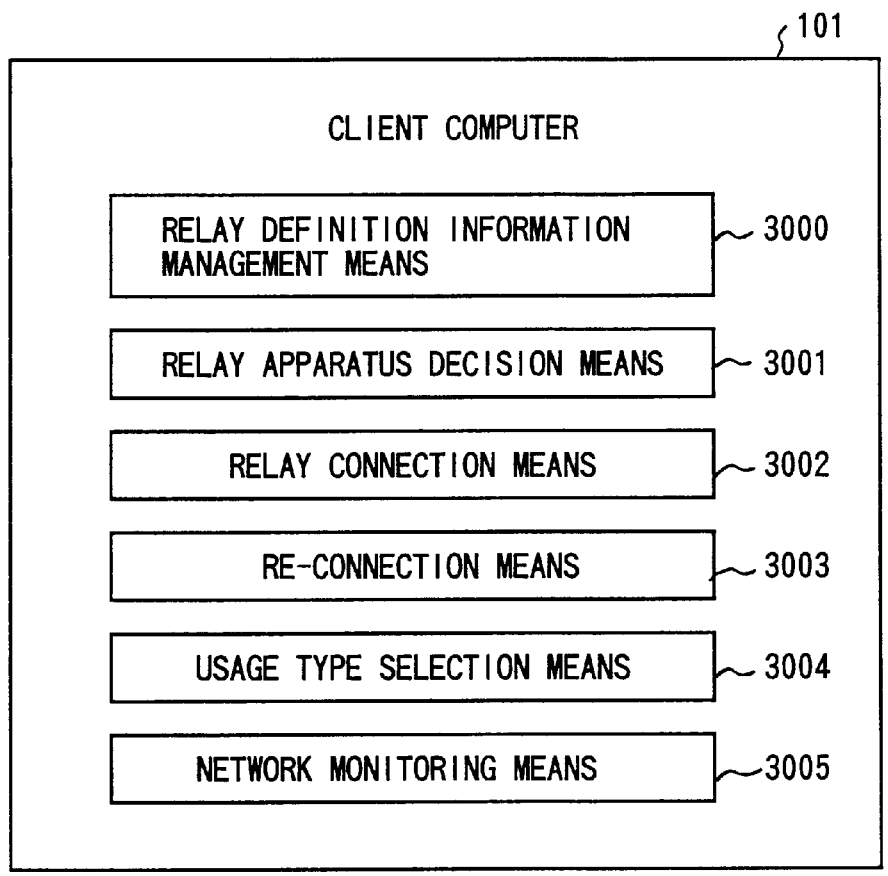
FIG. 25 shows a functional configuration of the client computer.

The client computer 101 has the software configuration as shown in FIG. 1 and the hardware configuration as shown in FIG. 4. On the other hand, the client computer 101 has the functional configuration as shown in FIG. 25. It is noted that FIG. 25 does not show all the functions which the client computer 101 has.

The client computer 101 has a relay definition information management means 3000, a relay apparatus determination means 3001, a relay connection means 3002, a re-connection means 3003, a usage type selection means 3004 and a network monitoring means 3005.

The relay definition information management means 3000 mainly corresponds to the gateway management table 16 and stores the relation between the information which identifies an apparatus to be communicated with and the information which identifies a relay apparatus (the gateway computer) relaying the communication with the apparatus to be communicated with.

The relay apparatus determination means 3001 determines the relay apparatus corresponding to the designated apparatus to be communicated with based on the information stored in the relay definition information management means 3000.

The relay connection means 3002 connects the client computer 101 with the relay apparatus determined by the relay apparatus determination means 3001 for relaying.

The re-connection means 3003 mainly corresponds to the re-connection program 103 and executes automatic re-connection when the network monitoring means 3005 detects the disconnection of the relay connection.

The usage type selection means 3004 mainly corresponds to the location management program 19 and selects one usage type from a plurality of usage types.

The network monitoring means 3005 mainly corresponds to the network monitoring program 103 and monitors the condition of the network.

As described above, the present invention is applied to the computer system as shown in FIG. 4. The communication control program according to the present invention is stored in a removable storage media, such as the PCMCIA 408, the floppy disk 409, etc. or is downloaded from an external data base through the modem 407.

The communication control program stored in the hard disk 404 or the floppy disk 409 is loaded to the memory 402 and is executed by the CPU 401 under the control of the operating system.

Further, the communication control program stored in the external data base is loaded to the memory 402 through the modem 407 and is executed by the CPU 401 under the control of the operating system.

As described above, the present invention can provide a communication control for the client-server system, which enables the client to connect with the server using any connection type without modification of any existing client application program. For example, it is possible that the client application program can communicate with the server application program through the gateway even if the client application program was not designated to use the gateway. Further, the present invention enables the recovery of the disconnected communication without initializing the application program when the network is disconnected during the communication.

Further, it is possible to automatically change the gateway to be used simply by selecting the usage type of the computer. Especially, this enables easy change of the configuration of the mobile computer which may be used under the various usage types.

The present invention is not limited to the specifically disclosed embodiments, and variations and modifications may be made without departing from the scope of the present invention as claimed.

What is claimed is:

1. A communication control method comprising:

responding to a communication connection request with a designated apparatus to be communicated with by, specifying a relay apparatus corresponding to the designated apparatus to be communicated with based on a predefined relay definition information which manages a relation between an information for specifying the apparatus to be communicated with for each one of a plurality of usage types and information for specifying the relay apparatus to relay a communication with said apparatus to be communicated with; and establishing a relay connection with the specified relay apparatus.

2. The communication control method as claimed in claim 1, wherein said plurality of usage types are identified by port numbers of TCP/IP protocol.

3. A communication control apparatus comprising:

a relay definition information management unit storing a relation between information for specifying an apparatus to be communicated with for each one of a plurality of usage types and information for specifying a relay apparatus to relay a communication with said apparatus to be communicated with;

a relay apparatus determination unit determining the relay apparatus corresponding to the designated apparatus to be communicated with based on information stored in said relay definition information management unit; and a relay connection unit establishing a relay connection with the relay apparatus determined by said relay apparatus determination unit.

4. The communication control apparatus as claimed in claim 2, wherein said relay definition information relates information for specifying the apparatus to be communicated with for each one of a plurality of usage types with the information for specifying the relay apparatus to relay the communication with said apparatus to be communicated with.

5. The communication control apparatus as claimed in claim 2, further comprising:

a usage type selection unit selecting one usage type from said plurality of usage types.

6. The communication control apparatus as claimed in claim 2, further comprising:

a re-connection unit automatically re-connecting said relay connection when said relay connection is disconnected.

7. The communication apparatus as claimed in claim 2, wherein said plurality of usage types are identified by port numbers of TCP/IP protocol.

8. A storage medium for storing a communication control program to be executed on a computer, the program performing:

responding to a communication connection request with a designated apparatus corresponding to the designated apparatus to be communicated with by, specifying a relay apparatus corresponding to the designated apparatus to be communicated with based on predefined relay definition information which relates information for specifying the apparatus to be communicated with for each one of a plurality of usage types with the information for specifying the relay apparatus to relay the communication with said apparatus to be communicated with; and establishing a relay connection with the specified relay apparatus.

9. The storage medium for storing a communication control program to be executed on said computer as claimed in claim 6, further comprising: selecting one usage type from said plurality of usage types.

10. The storage medium for storing a communication control program to be executed on said computer as claimed in claim 6, further comprising:

automatically re-connecting said relay connection when said relay connection is disconnected.

11. The storage medium as claimed in claim 6, wherein said plurality of usage types are identified by port numbers of TCP/IP protocol.

12. A storage medium storing a communication control program to be executed on a computer, said computer program performing:

a selection operation selecting a location information from a plurality of location information;

a relay apparatus determining operation, if connection type for a location information selected by said selection operation being to use a relay apparatus, determining a relay apparatus to be used for a communication with a specified counterpart apparatus, based on relay definition information defining a plurality of relations between identification information of an apparatus to be communicated with and identification information of a relay apparatus; and a relay connection establishing operation establishing a connection with a relay apparatus determined by said relay apparatus.

13. A communication control method comprising:

a selection operation selecting a location information from a plurality of location information;

a relay apparatus determination operation, in response to a request for communication with a designated apparatus, if connection type for a location information selected in said selection step being to use a relay apparatus, determining a relay apparatus to be used for a communication with the designated apparatus, based on relay definition information defining a plurality of relations between identification information of an apparatus to be communicated with and identification information of a relay apparatus; and a relay connection establishing operation establishing a connection with a relay apparatus determined in said relay apparatus.

14. A communication control apparatus comprising:

a selection unit selecting a location information from a plurality of location information;

a relay apparatus determination unit, in response to a request for communication with a designated apparatus, if connection type for a location information selected by said selection means being to use a relay apparatus, determining a relay apparatus to be used for a communication with the designated apparatus, based on relay definition information defining a plurality of relations between identification information of an apparatus to be communicated with and identification information of a relay apparatus; and a relay connection establish unit establishing a connection with a relay apparatus determined by said relay apparatus.

* * * * *